United States Patent

Irie

[11] 3,762,013
[45] Oct. 2, 1973

[54] BALL ASSEMBLY OF AN INDEXING DEVICE
[75] Inventor: Minoru Irie, Kyoto, Japan
[73] Assignee: Shinpo Kogyo Kabushiki Kaisha (Shinpo Industrial Co., Ltd.), Kyoto, Japan
[22] Filed: July 10, 1972
[21] Appl. No.: 270,332

[30] Foreign Application Priority Data
July 8, 1971 Japan.............................. 46/50497

[52] U.S. Cl................................ 29/200 P, 29/201
[51] Int. Cl........................ B23p 19/00, B23p 19/04
[58] Field of Search....................... 29/200 P, 208 F, 29/201

[56] References Cited
UNITED STATES PATENTS
3,116,543  1/1964  Schoos............................... 29/201

Primary Examiner—Thomas H. Eager
Attorney—Ralph E. Parker et al.

[57] ABSTRACT

A ring member of high hardness and a ring member of low hardness are combined. A row of balls as indexing elements are forcibly fitted between the two ring members. Basic surfaces are provided on the side of the ring member of high hardness. Indentations due to the forced fitting of the balls are created on the ring member of low hardness only.

1 Claim, 4 Drawing Figures

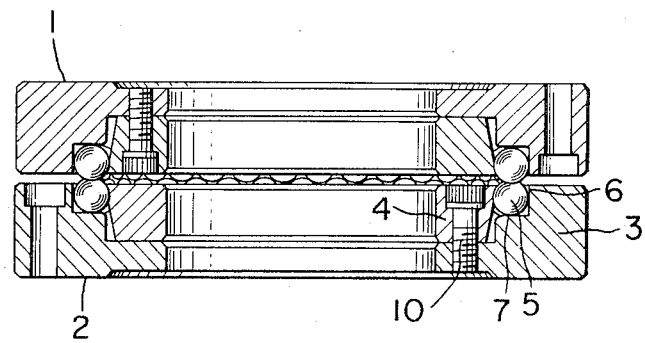
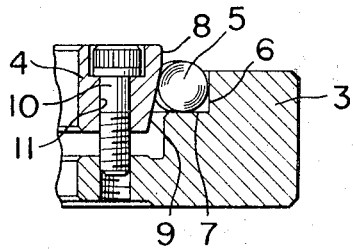 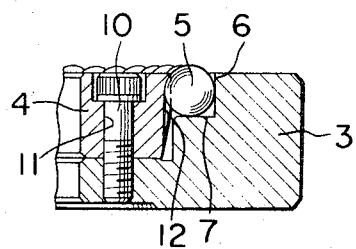
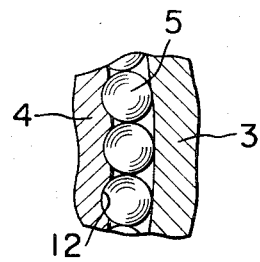

BALL ASSEMBLY OF AN INDEXING DEVICE

This invention relates to indexing devices and is concerned with the provision of an indexing device comprising a ball assembly, in which steel balls are used as indexing elements.

Steel balls of extremely accurate size are obtainable from the field of ball bearing industry. Therefore, the above-identified type of indexing device can be manufactured which is more accurate than other indexing devices of the crown gear type or of the pin-and-hole type, by reason of the fact that the accuracy of the balls may be fully utilized.

In the case of the above ball type indexing device, the balls must be held firmly so as sufficiently to bear against a large torque which might be applied or act on an indexing table. It must be noted, also, that very large torque acts on the row of balls by an inertia force due to a large mass of an indexing table, when an indexing process is carried out in a short time.

For fixing balls, it is known to use a reaction post, or a clamping ring; also to use a kind of hard bonding substance. However, the use of a reaction post lowers an intrinsically high accuracy obtainable by the use of balls and, further, the torque bearing capacity becomes relatively small. Use of a clamping ring is preferable so far as the accurate positioning of the balls is concerned, but it does not have sufficient ability to bear against a very large torque which might act on the balls. Use of a hard bonding substance may make it possible initially to bear against a large torque, but its duration of functioning is too short to make its use feasible commercially.

The object of the present invention is to provide a ball assembly of an indexing device which bears against a sufficiently large torque for a long time and which is easily constructed.

The present invention will now be explained in greater detail and with reference to the accompanying drawing, in which:

FIG. 1 is a vertically sectioned view of a pair of ball assemblies according to the present invention;

FIG. 2 is a partial view of one ball assembly showing an intermediate state in the course of assembling the same;

FIG. 3 is a view similar to FIG. 2 but showing a final state of assembly; and

FIG. 4 is a cross-sectioned fragmentary view of the assembly showing a final state of the balls secured between ring members.

In FIG. 1, the numeral 1 designates a ball assembly which will be fixed to an indexing table (not shown) and numeral 2 designates a ball assembly which will be fixed to a bed (not shown). As the construction of the ball assembly 1 is the same with that of the ball assembly 2, explanation of the ball assembly 2 will suffice.

The ball assembly 2 consists of a ring member 3 of high hardness, a ring member 4 of low hardness and a row of balls 5 retained between said members. For example, the ring member 3 has a hardness of RC 60, while the ring member has a hardness of RC 22. There are provided two basic surfaces 6, 7 on the hard ring member 3. Of these, the basic surface 6 is cylindrical for determining the radial positioning of the row of balls 5, whilst the basic surface 7 is flat and annular for determining the axial positioning of the row of balls 5. The diameter of the basic cylindrical surface 6 is calculated exactly in relation to the diameter of the balls 5. It is preferable to form the ring member 4 of low hardness with a cylindrical surface 8 succeeded by a conical surface 9 as shown in FIG. 2.

The row of balls 5 is held between the ring member 3 of high hardness and the ring member 4 of low hardness in a force fit state. First, a predetermined number of balls 5 are distributed on the surfaces 6, 7 of the ring member 3 of high hardness, and then the ring member 4 of low hardness is inserted from the side of the conical surface 9. A plurality of bolts 10 are employed for advancing the ring member 4 axially with respect to the row of balls 5. These bolts 10 pass through holes 11 in the ring member 4 of low hardness, and are screwed into the ring member 3 of high hardness. The axial advancing of the member 4 inwardly of the row of balls 5 creates stripes of indentation 12 on the cylindrical surface 8. FIG. 3 shows the final state of the above force fit process.

Indentation does not occur on the cylindrical surface 6 of the ring member 3 of high hardness owing to the difference of hardness between the ring members 3, 4. The above indentations 12 are shown somewhat exaggeratedly in FIGS. 2 and 3.

The bolts 10 are means for advancing the ring member 4, and after the ring member 4 has reached its final position, the bolts are no longer important.

The advance of the ring member 4 may be carried out by a hydraulic press.

In the case of the above-explained embodiment, the ring member of high hardness is arranged outside of the ring member of low hardness. But, this relation may be reversed, and the ring member of lower hardness may be arranged outside of the ring member of high hardness.

The ball assembly explained can be built in various machines so as to construct an indexing mechanism in them utilizing their suitable parts or portions.

I claim:

1. Ball assembly of an indexing device wherein steel balls are used as indexing elements, comprising a ring member of high hardness, a ring member of low hardness and a row of balls forcibly fitted between the above two ring members, basic surfaces for determining the accurate positioning of the balls being provided on the ring member of high hardness and identations due to the forced fitting of the balls being created on the ring member of low hardness only.

* * * * *